(12) United States Patent
Kim et al.

(10) Patent No.: US 8,149,699 B2
(45) Date of Patent: Apr. 3, 2012

(54) METHOD AND APPARATUS FOR CONTROLLING TRAFFIC ACCORDING TO USER

(75) Inventors: Sang Wan Kim, Daejeon (KR); Dong Won Kang, Daejeon (KR); Joon Kyung Lee, Daejeon (KR); Sang Sik Yoon, Gwangju (KR); Tae Sang Choi, Daejeon (KR); You Hyeon Jeong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 217 days.

(21) Appl. No.: 12/559,604

(22) Filed: Sep. 15, 2009

(65) Prior Publication Data

US 2010/0135157 A1 Jun. 3, 2010

(30) Foreign Application Priority Data

Dec. 2, 2008 (KR) .......................... 10-2008-0121236
Apr. 9, 2009 (KR) .......................... 10-2009-0030885

(51) Int. Cl.
*H04L 12/26* (2006.01)
*H04L 12/56* (2006.01)

(52) U.S. Cl. ....................................... 370/230; 370/392

(58) Field of Classification Search ................... 370/232, 370/392
See application file for complete search history.

(56) References Cited

U.S. PATENT DOCUMENTS

| | | | |
|---|---|---|---|
| 2007/0117557 A1* | 5/2007 | Adjali et al. | 455/418 |
| 2007/0177600 A1* | 8/2007 | Suzuki et al. | 370/392 |
| 2008/0043979 A1* | 2/2008 | Li et al. | 379/230 |
| 2008/0294588 A1* | 11/2008 | Morris et al. | 706/47 |

FOREIGN PATENT DOCUMENTS

| | | |
|---|---|---|
| JP | 2006-054652 A | 2/2006 |
| KR | 1020060056195 A | 5/2006 |
| KR | 1020070060441 A | 6/2007 |
| KR | 1020070083089 A | 8/2007 |

* cited by examiner

*Primary Examiner* — Derrick Ferris
*Assistant Examiner* — Angel Brockman
(74) *Attorney, Agent, or Firm* — Ladas & Parry LLP

(57) ABSTRACT

There is provided a method and apparatus for controlling traffic according to user that includes a statistics processing unit measuring traffic volume used according to user, calculating a traffic variation ΔV by using the measured traffic volume, and updating a traffic user list by comparing the calculated traffic variation ΔV; a traffic detecting unit determining whether abnormal traffic is generated in a network and transferring a control command according to priority in the traffic user list; and a packet controlling unit controlling a user's traffic according to the control command received from the traffic detecting unit.

13 Claims, 3 Drawing Sheets

METHOD AND APPARATUS FOR CONTROLLING TRAFFIC ACCORDING TO USER

CROSS-REFERENCE TO RELATED APPLICATIONS

This application claims the priorities of Korean Patent Application Nos. 10-2008-0121236 filed on Dec. 2, 2008 and 10-2009-0030885 filed on Apr. 9, 2009, respectively, in the Korean Intellectual Property Office, the disclosures of which are incorporated herein by reference.

BACKGROUND OF THE INVENTION

1. Field of the Invention

The present invention relates to a method and apparatus for controlling traffic according to user, and more particularly, to a method and apparatus for controlling traffic according to user that detects traffic abnormalities according to an Internet user's online behavior and controls the traffic of users whose behaviors are at variance with regular Internet user behavior patterns through the use of priority control.

2. Description of the Related Art

Currently, various methods of detecting abnormal or unusual network traffic are being suggested. However, most techniques currently applied to networks use a method of setting a threshold value for total traffic volume, comparing the preset threshold value with current traffic volume, and preventing packet transmission. Accordingly, the related art may be easily applied to the network, but may have difficulty in effectively controlling abnormal traffic.

Also, there is another technique of detecting suspected abnormal network traffic, analyzing the patterns of detected traffic, and controlling traffic having the same pattern. This pattern analysis technique has the advantage of high accuracy in detecting and controlling abnormal traffic. However, since a complex algorithm needs to be applied in order to detect patterns of abnormal traffic, this technique has the disadvantage of requiring a great deal of resource allocation and cost. In particular, as the speed of a network becomes higher through the use of high-speed lines, an abnormal traffic detection method using the pattern analysis technique has difficulty in processing large volumes of traffic on high-speed lines and effectively controlling such abnormal traffic in real time due to the complexity of the algorithm used.

SUMMARY OF THE INVENTION

An aspect of the present invention provides a method and apparatus for controlling traffic according to user in order to proactively prevent damage against the entire network caused by abnormal traffic on the managed network and enhance network stability.

According to an aspect of the present invention, there is provided an apparatus for controlling traffic according to user, the apparatus including: a statistics processing unit measuring traffic volume used according to user, calculating a traffic variation $\Delta V$ by using the measured traffic volume, and updating a traffic user list by comparing the calculated traffic variation $\Delta V$; a traffic detecting unit determining whether abnormal traffic is generated in a network and transferring a control command according to priority in the traffic user list; and a packet controlling unit controlling a user's traffic according to the control command received from the traffic detecting unit.

According to another aspect of the present invention, there is provided a method of controlling traffic according to user, the method including: measuring traffic volume used according to user and calculating a traffic variation $\Delta V$ by using the measured traffic volume; updating a traffic user list on the basis of a high value in the traffic variation $\Delta V$; and determining whether abnormal traffic is generated in a network and controlling a user's traffic according to priority in the traffic user list.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings. However, detailed descriptions related to well-known functions or configurations will be ruled out in order not to unnecessarily obscure subject matters of the present invention.

According to an exemplary embodiment of the present invention, monitoring cycle T is a cycle for monitoring a user's maximum traffic usage Vh according to user; monitoring time Tn is a timer for checking the monitoring cycle T; the user's maximum traffic usage Vh is the maximum traffic volume used for the monitoring cycle T according to user; a user's real-time traffic usage Vn is the traffic volume being used in real time according to user; a user's real-time maximum traffic usage Vmax is the maximum traffic volume being used in real time according to user; traffic variation $\Delta V$ ($\Delta V = Vn - Vh$) is the value obtained by subtracting the user's maximum traffic usage Vh from the user's real-time traffic usage Vn; a network's total available traffic threshold value Vlim is the total available traffic threshold value on a managed network; and a network's total traffic usage Vtv is the total traffic volume of the managed network.

Figure 1:
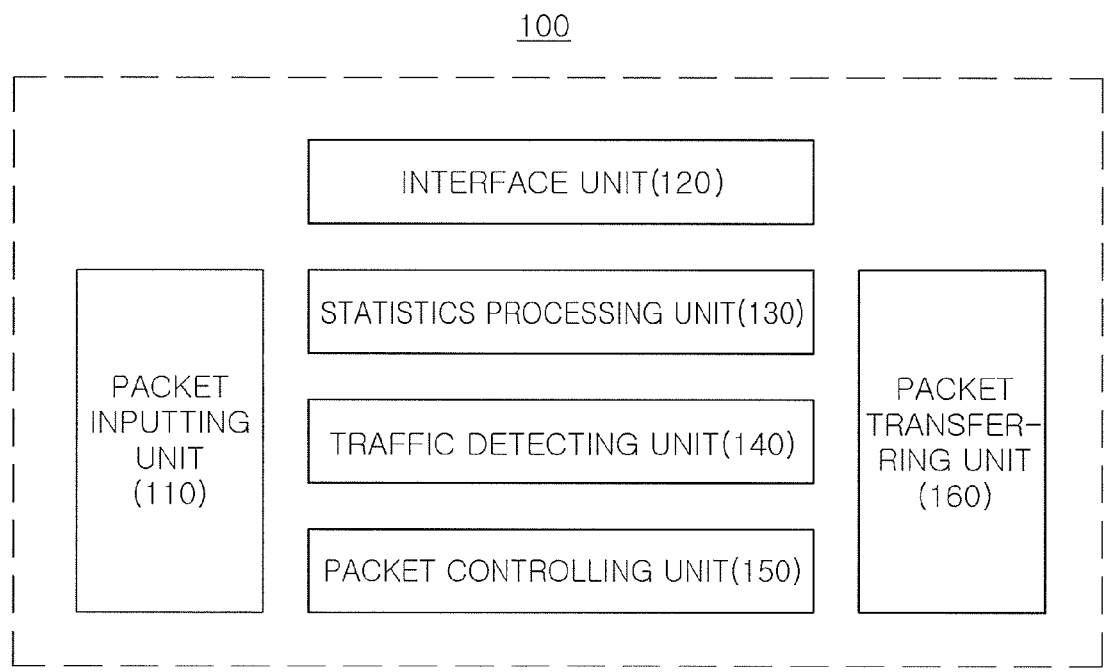
FIG. 1 is a block diagram schematically illustrating a configuration of an apparatus for controlling traffic according to user, according to an exemplary embodiment of the present invention.

FIG. 1 is a block diagram schematically illustrating a configuration of an apparatus for controlling traffic according to user, according to an exemplary embodiment of the present invention.

Referring to FIG. 1, an apparatus 100 for controlling traffic according to user includes a packet inputting unit 110, an interface unit 120, a statistics processing unit 130, a traffic detecting unit 140, a packet controlling unit 150, and a packet transferring unit 160.

The packet inputting unit 110 receives packets and transfers the received packets to each of the statistics processing unit 130, the traffic detecting unit 140, and the packet controlling unit 150 for statistics processing and abnormal traffic detection.

The interface unit 120 receives a user-defined value, including a monitoring cycle T, a network's total available traffic threshold value Vlim, and a user's maximum traffic usage Vh required for abnormal traffic processing, from a network manager, and outputs the results of the processing.

The statistics processing unit 130 measures traffic volume that is used according to user, calculates a traffic variation ΔV by using the measured traffic volume, and updates a traffic user list by comparing the calculated traffic variation ΔV.

That is, the statistics processing unit 130 compares a user's updated maximum traffic usage Vh with a user's real-time traffic usage Vn, calculates a traffic variation ΔV by subtracting the user's updated maximum traffic usage Vh from the user's real-time traffic usage Vn, and continuously updates the traffic user list on the basis of the highest value from among the calculated traffic variation ΔV. At this time, the statistics processing unit 130 may record a user's maximum traffic usage Vh for a monitoring time Tn and update the user's maximum traffic usage Vh according to monitoring cycles T.

The traffic detecting unit 140 determines whether abnormal traffic is generated in the network and transfers a control command to the packet controlling unit 150 for controlling a user's traffic according to priority in the traffic user list. When a network's total traffic usage Vtv exceeds a network's total available traffic threshold value Vlim, the traffic detecting unit 140 causes the packet controlling unit 150 to control the user's traffic until the network's total traffic usage Vtv falls below the network's total available traffic threshold value Vlim.

The packet controlling unit 150 controls a user's traffic according to the control command received from the traffic detecting unit 140.

The packet transferring unit 160 transforms packets, which are transferred through the packet controlling unit 150, in a format connectable to an external network device (not shown) and transfers the transformed packets to the external network device.

Figure 2:
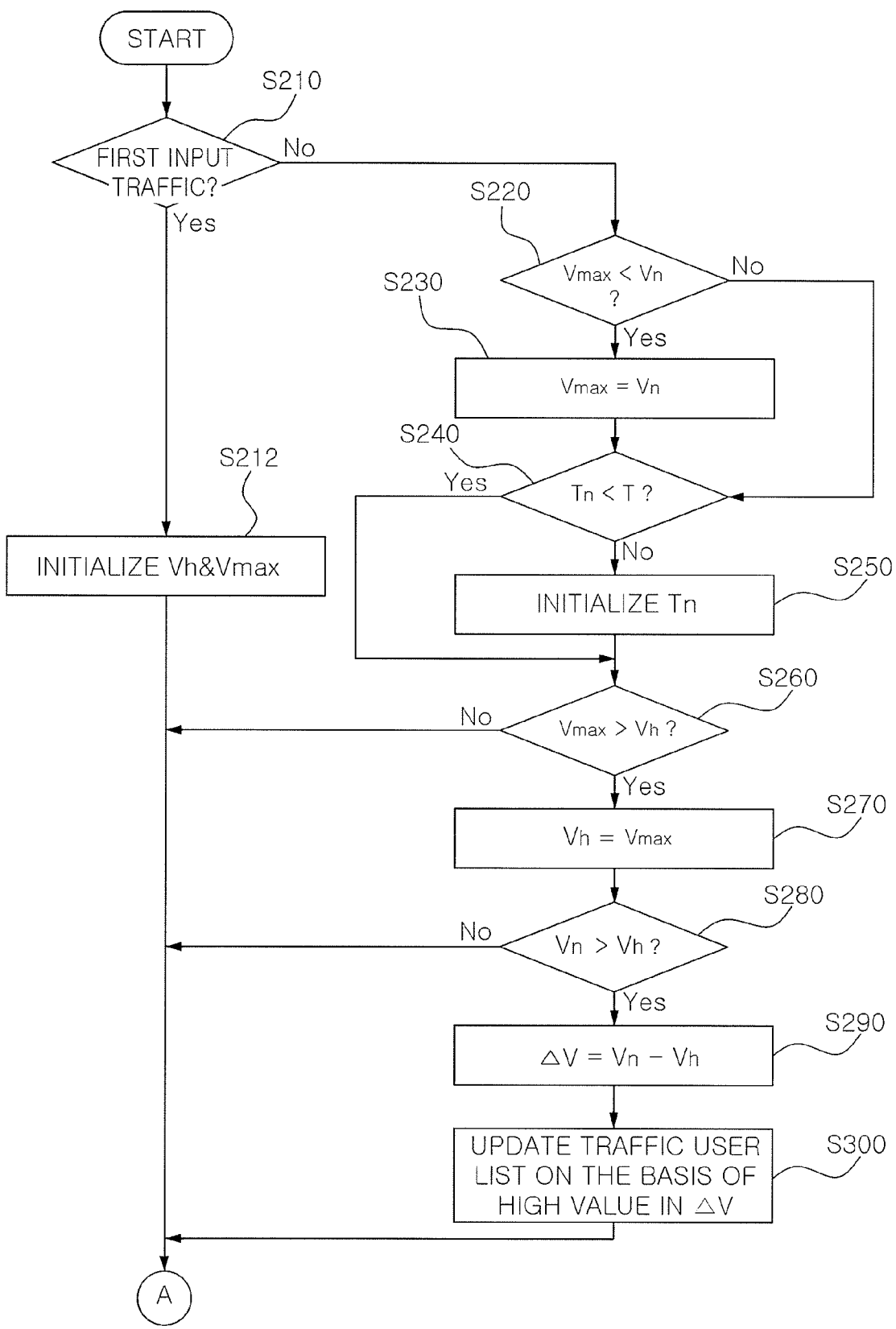
FIG. 2 is a flowchart illustrating a method of updating a traffic user list according to an exemplary embodiment of the present invention.

FIG. 2 is a flowchart illustrating a method of updating a traffic user list according to an exemplary embodiment of the present invention.

Referring to FIG. 2, it is determined whether traffic is first input according to user in operation S210. When the traffic is first input traffic, a user's maximum traffic usage Vh and a user's real-time maximum traffic usage Vmax are initialized in operation S212.

When the traffic is not the first input traffic in operation S210, a user's real-time traffic usage Vn is updated and it is determined whether the user's real-time traffic usage Vn is greater than a user's real-time maximum traffic usage Vmax in operation S220.

When the user's real-time traffic usage Vn is greater than the user's real-time maximum traffic usage Vmax, the user's real-time traffic usage Vn is used as the user's real-time maximum traffic usage Vmax in operation S230.

Subsequently, it is determined whether a monitoring cycle T is greater than a monitoring time Tn in operation S240. When the monitoring time Tn is greater than the monitoring cycle T, the monitoring time Tn is initialized in operation S250.

When the monitoring cycle T is greater than the monitoring time Tn in operation S240, it is determined whether the user's real-time maximum traffic usage Vmax is greater than the user's maximum traffic usage Vh in operation S260.

When the user's real-time maximum traffic usage Vmax is greater than the user's maximum traffic usage Vh in operation S260, the user's real-time maximum traffic usage Vmax is used as the user's maximum traffic usage Vh in operation S270.

Subsequently, it is determined whether the user's real-time traffic usage Vn is greater than the user's maximum traffic usage Vh in operation S280. When the user's real-time traffic usage Vn is greater than the user's maximum traffic usage Vh, a traffic variation ΔV is calculated by subtracting the user's maximum traffic usage Vh from the user's real-time traffic usage Vn in operation S290.

Lastly, the traffic user list is updated on the basis of a high value in the traffic variation ΔV in operation S300.

Accordingly, if abnormal traffic is generated in a network, a user's traffic is controlled according to priority in the traffic user list. This will now be described in detail with reference to FIG. 3.

Figure 3:
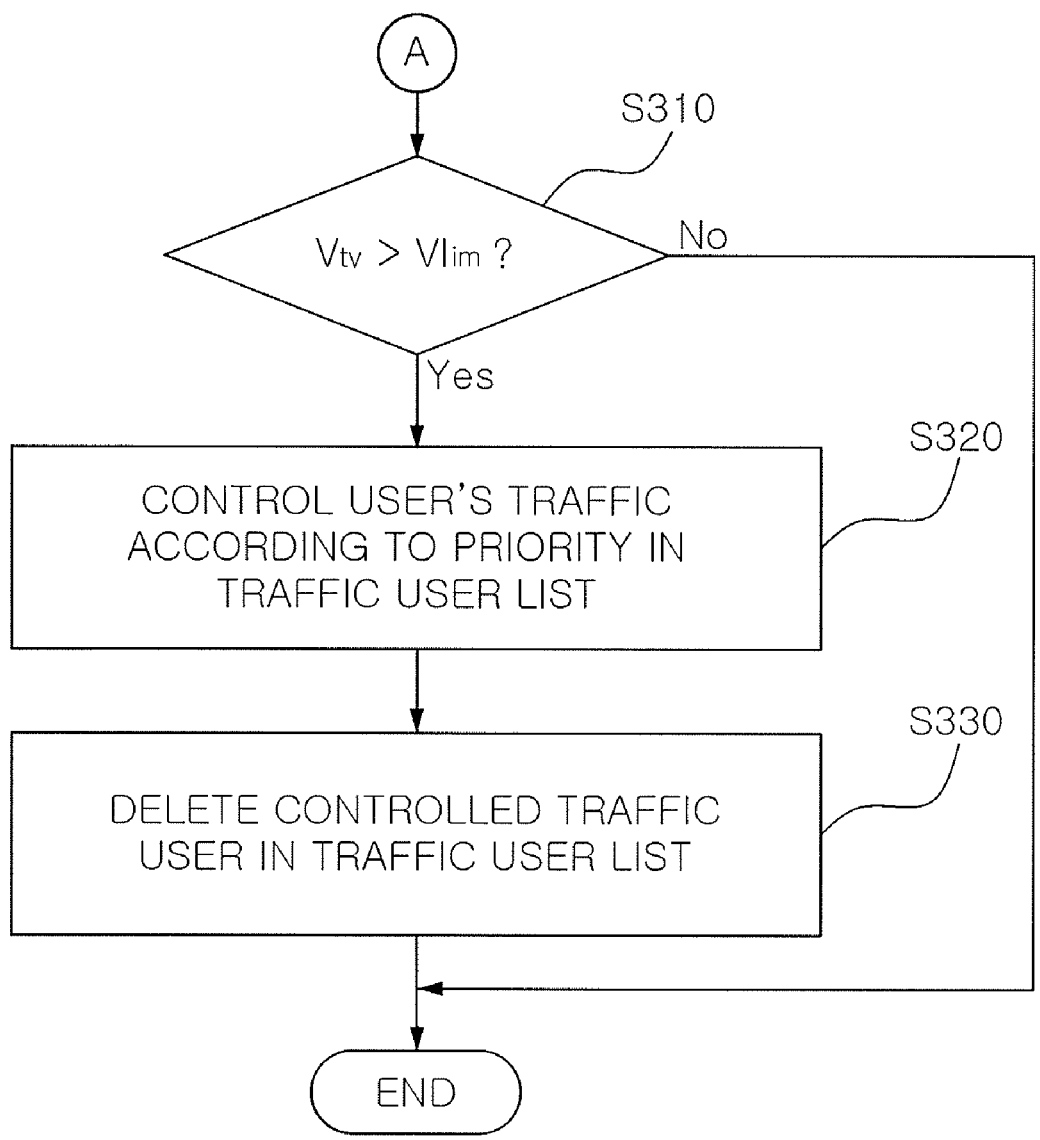
FIG. 3 is a flowchart illustrating a method of controlling traffic according to priority in a traffic user list, according to an exemplary embodiment of the present invention.

FIG. 3 is a flowchart illustrating a method of controlling traffic according to priority in a traffic user list, according to an exemplary embodiment of the present invention.

First of all, a network's total available traffic threshold value Vlim is set, which is a total available traffic threshold value on a managed network.

Referring to FIG. 3, it is determined whether a network's total traffic usage Vtv exceeds the network's total available traffic threshold value Vlim in operation S310. When the network's total traffic usage Vtv exceeds the network's total available traffic threshold value Vlim, a user's traffic is controlled according to priority in the traffic user list in operation S320. At this time, the user's traffic is controlled until the network's total traffic usage Vtv falls below the network's total available traffic threshold value Vlim.

Subsequently, by deleting the controlled traffic user in the traffic user list in operation S330, a user who is in a secondary position in the traffic user list may be controlled.

As set forth above, according to exemplary embodiments of the invention, when traffic abnormalities are detected, traffic control is performed according to user considering a user's behavior, thereby minimizing any damage against total network traffic caused by abnormal traffic and enhancing network stability, relative to a method of controlling abnormal traffic by using only traffic threshold values.

Also, according to exemplary embodiments of the invention, a simple algorithm is used relative to a method of detecting and preventing abnormal traffic by pattern analysis of the abnormal traffic, thereby acquiring cost effectiveness and ease of realization.

While the present invention has been shown and described in connection with the exemplary embodiments, it will be apparent to those skilled in the art that modifications and variations can be made without departing from the spirit and scope of the invention as defined by the appended claims.

What is claimed is:

1. An apparatus for controlling traffic according to user, the apparatus comprising:
 a statistics processing unit setting a total available traffic threshold value on a managed network, measuring traffic volume used according to user, calculating a traffic variation ΔV by using the measured traffic volume, and updating a traffic user list by comparing the calculated traffic variation ΔV, wherein a monitoring time is initialized when the monitoring time is greater than a monitoring cycle, and a comparison is made between a user's real-time maximum traffic usage and a user's maximum traffic usage when the monitoring cycle is greater than the monitoring time, and wherein a user in a secondary position in the traffic user list is configured to be controlled when a user in a primary position in the traffic user list is deleted;

a traffic detecting unit determining whether abnormal traffic is generated in a network and transferring a control command according to priority in the traffic user list;

a packet controlling unit controlling a user's traffic according to the control command received from the traffic detecting unit;

a packet inputting unit receiving packets and transferring the received packets to the statistics processing unit; and a packet transferring unit transforming packets transferred through the packet controlling unit into a format configured to connect to an external network device, and transferring the transformed packets to the external network device.

2. The apparatus of claim 1, further comprising an interface unit receiving, from a network manager, a user-defined value including at least one of a monitoring cycle T, a network's total available traffic threshold value Vlim, and a user's maximum traffic usage Vh for abnormal traffic processing, and outputting a result of the processing.

3. The apparatus of claim 2, wherein the statistics processing unit records the user's maximum traffic usage Vh for a monitoring time Tn and updates the user's maximum traffic usage Vh according to monitoring cycles T.

4. The apparatus of claim 3, wherein the statistics processing unit compares the user's updated maximum traffic usage Vh with user's real-time traffic usage Vn, calculates a traffic variation $\Delta V$ by subtracting the user's updated maximum traffic usage Vh from the user's real-time traffic usage Vn, and continuously updates the traffic user list on the basis of the highest value from among the calculated traffic variation $\Delta V$.

5. The apparatus of claim 2, wherein the traffic detecting unit causes the packet controlling unit to control the user's traffic until a network's total traffic usage Vtv falls below the network's total available traffic threshold value Vlim when the network's total traffic usage Vtv exceeds the network's total available traffic threshold value Vlim.

6. A method of controlling traffic according to user, the method comprising:
setting a total available traffic threshold value on a managed network;
receiving packets;
transferring the received packets to a processing unit;
measuring traffic volume used according to user;
initializing a monitoring time when the monitoring time is greater than a monitoring cycle;
comparing a user's real-time maximum traffic usage and a user's maximum traffic usage when the monitoring cycle is greater than the monitoring time;
calculating a traffic variation $\Delta V$ by using the measured traffic volume;
updating a traffic user list on the basis of a high value in the traffic variation $\Delta V$;
determining whether abnormal traffic is generated in a network and controlling a user's traffic according to priority in the traffic user list;
deleting a controlled traffic user in the traffic user list;
controlling a user in a secondary position in the traffic user list;
transforming packets into a format configured to connect to an external network device; and
transferring the transformed packets to the external network device.

7. The method of claim 6, wherein the calculating of the traffic variation $\Delta V$ comprises:
determining whether traffic is first input according to user;
comparing a user's real-time traffic usage Vn with a user's real-time maximum traffic usage Vmax and updating the user's real-time maximum traffic usage Vmax when the traffic is not first input traffic;
determining whether a cycle of updating a user's maximum traffic usage Vh returns by comparing a monitoring time Tn with a monitoring cycle T;
comparing the user's real-time maximum traffic usage Vmax with the user's maximum traffic usage Vh and updating the user's maximum traffic usage Vh when the cycle of updating the user's maximum traffic usage Vh returns; and
calculating the traffic variation $\Delta V$ by subtracting the user's maximum traffic usage Vh from the user's real-time traffic usage Vn when the user's real-time traffic usage Vn is greater than the user's maximum traffic usage Vh.

8. The method of claim 7, wherein the updating of the user's real-time maximum traffic usage Vmax comprises using the user's real-time traffic usage Vn as the user's real-time maximum traffic usage Vmax when the user's real-time traffic usage Vn is greater than the user's real-time maximum traffic usage Vmax.

9. The method of claim 7, wherein the updating of the user's maximum traffic usage Vh comprises using the user's real-time maximum traffic usage Vmax as the user's maximum traffic usage Vh when the user's real-time maximum traffic usage Vmax is greater than the user's maximum traffic usage Vh.

10. The method of claim 7, further comprising initializing the user's maximum traffic usage Vh and the user's real-time maximum traffic usage Vmax when the traffic is first input traffic.

11. The method of claim 6, wherein the controlling of the user's traffic comprises:
determining whether a network's total traffic usage Vtv exceeds a network's total available traffic threshold value Vlim; and
controlling the user's traffic according to priority in the traffic user list when the network's total traffic usage Vtv exceeds the network's total available traffic threshold value Vlim.

12. The method of claim 11, wherein the controlling of the user's traffic according to priority in the traffic user list comprises controlling the user's traffic until the network's total traffic usage Vtv falls below the network's total available traffic threshold value Vlim.

13. A method of controlling traffic according to user, the method comprising:
setting a total available traffic threshold value on a managed network;
receiving packets;
transferring the received packets to a processing unit;
measuring traffic volume used according to a user;
initializing a monitoring time when the monitoring time is greater than a monitoring cycle;
comparing a user's real-time maximum traffic usage and a user's maximum traffic usage when the monitoring cycle is greater than the monitoring time;
calculating a traffic variation $\Delta V$ by using the measured traffic volume;
updating a traffic user list on the basis of a high value in the traffic variation $\Delta V$;
determining whether abnormal traffic is generated in a network and controlling a user's traffic according to priority in the traffic user list; and
controlling a user in a secondary position in the traffic user list when a controlled traffic user is deleted from the traffic user list.

* * * * *